US012185041B2

(12) United States Patent
Akai et al.

(10) Patent No.: US 12,185,041 B2
(45) Date of Patent: Dec. 31, 2024

(54) SOUND RADIATION APPRATUS, ELECTRONIC MUSICAL INSTRUMENT, AND SOUND RADIATION APPRATUS FABRICATION METHOD

(71) Applicant: CASIO COMPUTER CO., LTD., Tokyo (JP)

(72) Inventors: Hiroki Akai, Hino (JP); Kazuo Shimada, Tachikawa (JP); Hirokatsu Katoh, Kawasaki (JP); Takahiro Moriya, Kokubunji (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 207 days.

(21) Appl. No.: 18/082,741

(22) Filed: Dec. 16, 2022

(65) Prior Publication Data

US 2023/0199352 A1 Jun. 22, 2023

(30) Foreign Application Priority Data

Dec. 22, 2021 (JP) ................................. 2021-207671
Oct. 27, 2022 (JP) ................................. 2022-172172

(51) Int. Cl.
*H04R 1/02* (2006.01)
*H04R 1/40* (2006.01)
*H04R 31/00* (2006.01)

(52) U.S. Cl.
CPC ............. *H04R 1/023* (2013.01); *H04R 1/025* (2013.01); *H04R 1/403* (2013.01); *H04R 31/006* (2013.01); *H04R 2400/11* (2013.01)

(58) Field of Classification Search
CPC ........ H04R 1/023; H04R 1/025; H04R 1/403; H04R 31/006; H04R 2400/11
See application file for complete search history.

(56) References Cited

U.S. PATENT DOCUMENTS 8,502,062 B2 * 8/2013 Mishima .................. G10H 1/32 84/743
8,742,241 B2 * 6/2014 Irimura .................... G10H 1/32 84/423 R (Continued)

FOREIGN PATENT DOCUMENTS

JP 2006189514 A * 7/2006 ............... G10H 1/32
JP 2008310055 A * 12/2008 ............... G10H 1/32

(Continued)

*Primary Examiner* — Oyesola C Ojo
(74) *Attorney, Agent, or Firm* — Holtz, Holtz & Volek PC

(57) ABSTRACT

A sound radiation apparatus includes a speaker, a first cover having an opening area provided to be superposed above at least a sound radiation port of the speaker and made up of multiple opening portions at a location superposed above the speaker, a second cover superposed on a front side of the first cover while surrounding the opening area of the first cover, and a saran net covering the first cover and a front side of the second cover and bonded to the second cover, wherein the second cover and the saran net are bonded together at an area on the second member excluding a portion surrounding the opening area of the first cover with a first adhesive and an area on the second cover surrounding the opening area of the first cover with a second adhesive having a higher bonding strength than that of the first adhesive.

15 Claims, 8 Drawing Sheets

(56) References Cited

U.S. PATENT DOCUMENTS

| | | | | |
|---|---|---|---|---|
| 8,791,352 B2 * | 7/2014 | Takahashi | H04R 1/02 | 381/387 |
| 8,841,528 B2 * | 9/2014 | Hoshino | G10C 3/12 | 84/423 R |
| 8,939,252 B2 * | 1/2015 | Sanborn | H04R 1/023 | 181/199 |
| 9,275,612 B2 * | 3/2016 | Suenaga | G10H 1/32 | |
| 10,129,378 B2 * | 11/2018 | Nonaka | H04M 1/035 | |
| 10,200,784 B2 * | 2/2019 | Yamazaki | H04R 1/2888 | |
| 10,249,277 B2 * | 4/2019 | Hoshino | G10H 1/32 | |
| 2008/0072747 A1 * | 3/2008 | Nishida | G10H 1/32 | 84/744 |
| 2010/0288110 A1 * | 11/2010 | Hoshino | G10H 1/32 | 84/744 |
| 2012/0134518 A1 * | 5/2012 | Otani | H04R 1/023 | 381/189 |
| 2020/0213692 A1 * | 7/2020 | Yin | H04R 1/023 | |
| 2023/0306942 A1 * | 9/2023 | Katoh | G10H 1/047 | |

FOREIGN PATENT DOCUMENTS

| | | | | |
|---|---|---|---|---|
| JP | 2010176110 A | * | 8/2010 | G09B 19/04 |
| JP | 2019068146 A | * | 4/2019 | H04R 1/02 |

* cited by examiner

SOUND RADIATION APPRATUS, ELECTRONIC MUSICAL INSTRUMENT, AND SOUND RADIATION APPRATUS FABRICATION METHOD

CROSS-REFERENCE TO RELATED APPLICATION

This patent application is based upon and claims the benefit of priority under 35 USC 119 to Japanese Patent Application No. 2021-207671 filed on Dec. 22, 2021, and the content thereof, including the specification, claims, drawings and abstract, is incorporated herein by reference in its entirety.

BACKGROUND

Technical Field

The present disclosure relates to a sound radiation apparatus, an electronic musical instrument, and a sound radiation apparatus fabrication method.

Description of the Related Art

There have conventionally been proposed covering members made up of a saran net or the like and configured to be provided on a sound radiation side of a sound radiation apparatus such as a speaker apparatus or the like provided in an acoustic device such as an electronic musical instrument to cover a sound radiation port thereof. For example, Japanese Patent Laid-Open No. 2019-68146 (JP-A-2019-68146) discloses a sound radiation structure in which a covering member, which can transmit sound, is fixed to a sound radiation body. In this sound radiation structure, a groove portion is provided in the sound radiation body so that a fixing member is pushed thereinto. With the sound radiation body covered with the covering member, a portion of the covering member is held between the groove portion and the fixing member and is then pushed into the groove portion to thereby fix the covering member strongly to the sound radiation body.

SUMMARY

According to an aspect of the present disclosure, there is provided a sound radiation apparatus including a sound radiation unit, a first member having an opening area which is provided in such a manner as to be superposed above at least a sound radiation port of the sound radiation unit and which is made up of multiple opening portions at a location which is superposed above the sound radiation port, a second member provided to be superposed on a side of the first member which is opposite to a side thereof which faces the sound radiation unit in such a manner as to surround the opening area of the first member, and a covering member configured to cover the first member and a side of the second member which is opposite to a side thereof which faces the sound radiation unit and bonded to the second member, wherein the second member and the covering member are bonded together at an area on the second member which excludes a portion surrounding a circumference of the opening area of the first member with a first adhesive and at an area on the second member which surrounds the circumference of the opening area of the first member with a second adhesive having a higher bonding strength than a bonding strength of the first adhesive.

According to another aspect of the present disclosure, there is provided an electronic musical instrument comprising the above-described sound radiation apparatus.

According to yet another aspect of the present disclosure, there is provided a sound radiation apparatus fabrication method including a first disposition step of disposing a first member having an opening area made up of multiple opening portions in such a manner that the opening area is superposed above a sound radiation port of a sound radiation unit, a second disposition step of disposing a second member to be disposed on a side of the first member which is opposite to a side thereof which faces the sound radiation unit in such a manner as to surround the opening area of the first member, and a bonding step of bonding a covering member to the second member in such a manner as to cover the first member and a side of the second member which is opposite to a side thereof which faces the sound radiation unit, wherein in the bonding step, the second member and the covering member are bonded together at an area on the second member which excludes a portion surrounding a circumference of the opening area of the first member with a first adhesive and an area on the second member which surrounds the circumference of the opening area of the first member with a second adhesive having a higher bonding strength than a bonding strength of the first adhesive.

DESCRIPTION OF THE EMBODIMENT

Figure 1:
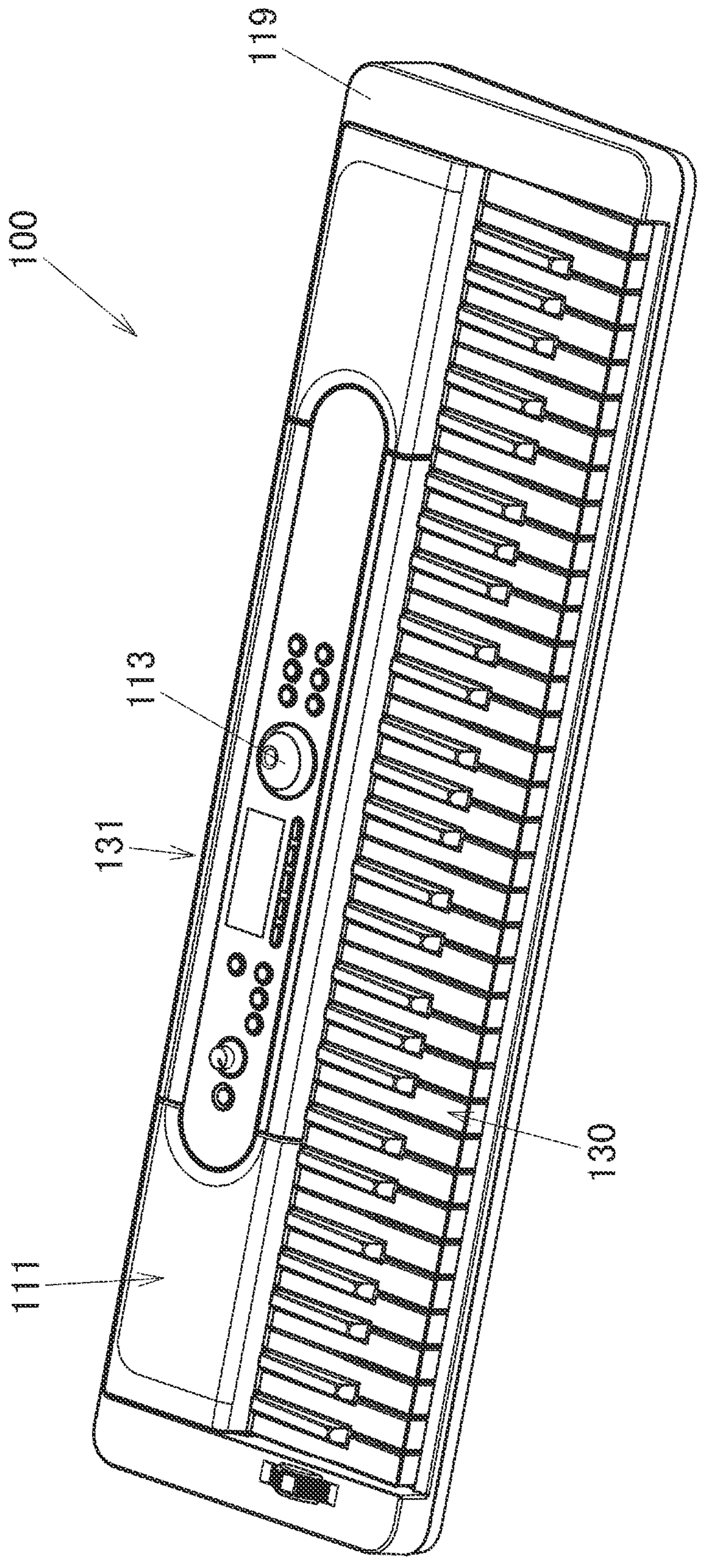
FIG. 1 is a perspective view showing an external appearance of an electronic musical instrument according to the application example of the present disclosure.
Figure 2:
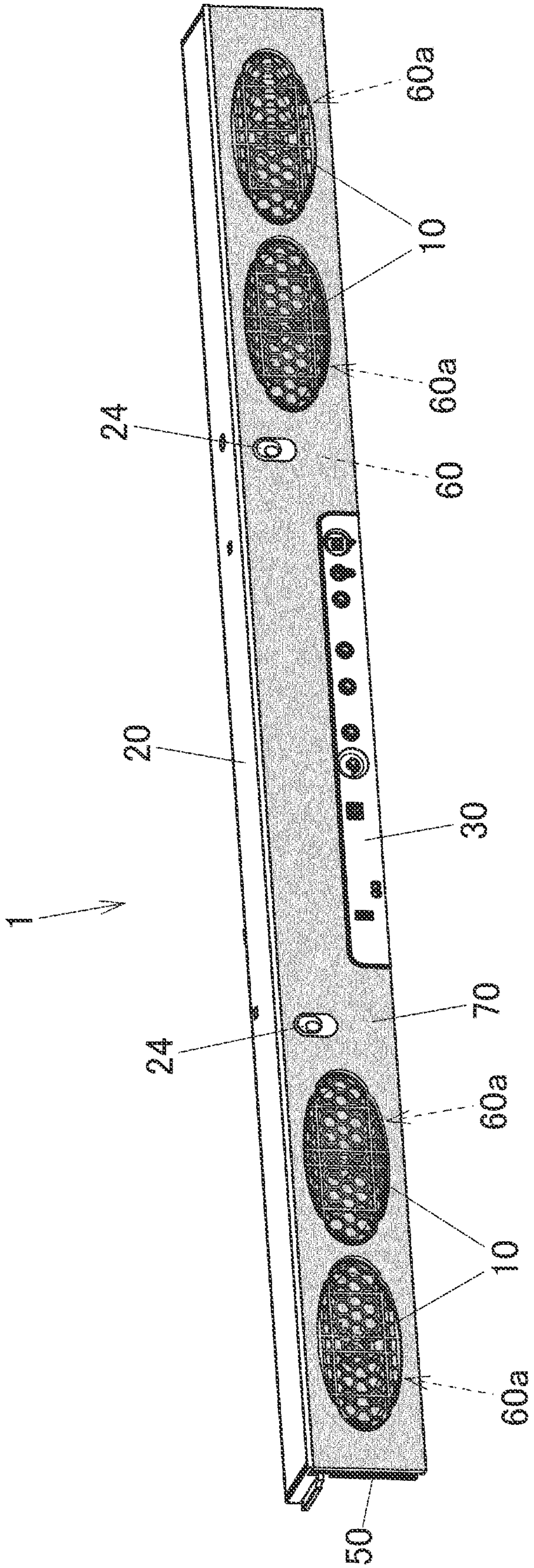
FIG. 2 is an overall perspective view showing a main part of a speaker apparatus according to an application example of the present disclosure.

Hereinafter, an application example of the present disclosure will be described based on drawings. As shown in FIG. 1, an electronic keyboard instrument 100 (an electronic musical instrument) which is an acoustic device comprises a keyboard 130 consisting of sixty-one keys and an instrument case 119. An operating section 131 having an adjustment knob 113 is provided at the upper surface 111 of the electronic musical instrument 100. As shown in FIG. 2, the back side of the instrument case 119 is formed as a sound radiation apparatus having a plurality of speakers 10.

Figure 3:
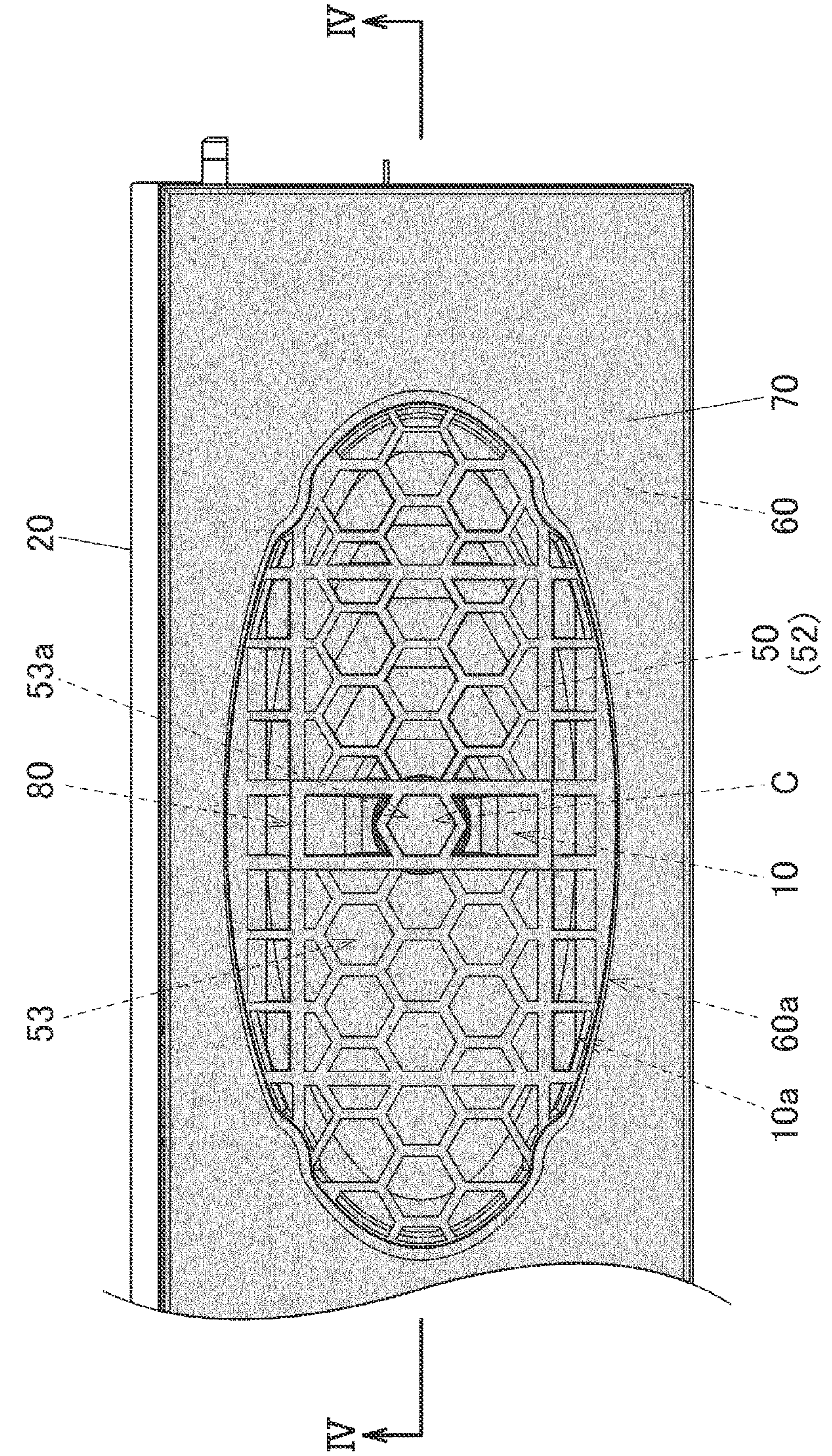
FIG. 3 is a front view showing a nearby area of a speaker according to the application example of the present disclosure in an enlarged fashion.

Referring to FIGS. 2 to 7, an application example of the present disclosure will be described. FIG. 2 is an overall perspective view showing a main part of a speaker apparatus (a sound radiation apparatus) 1 according to the application example of the present disclosure. As shown in FIG. 2, the speaker apparatus 1 includes four speakers (sound radiation units) 10, which are disposed in such a manner that sound radiation sides are oriented substantially to a front side (a nearer side in FIG. 2). In the following description, an upside of the speaker apparatus 1 in FIGS. 2 and 3 is referred to as an upper side, and an opposite side is referred to a lower side. A right side of the speaker apparatus 1 in FIGS. 2 and 3 is referred to as a right side, and an opposite side is referred to as a left side. A nearer side of the speaker apparatus 1 (a sound radiation side of each speaker 10) is referred to as a front side (a front side), and an opposite side is referred to as a rear side (a back side).

Figure 5:
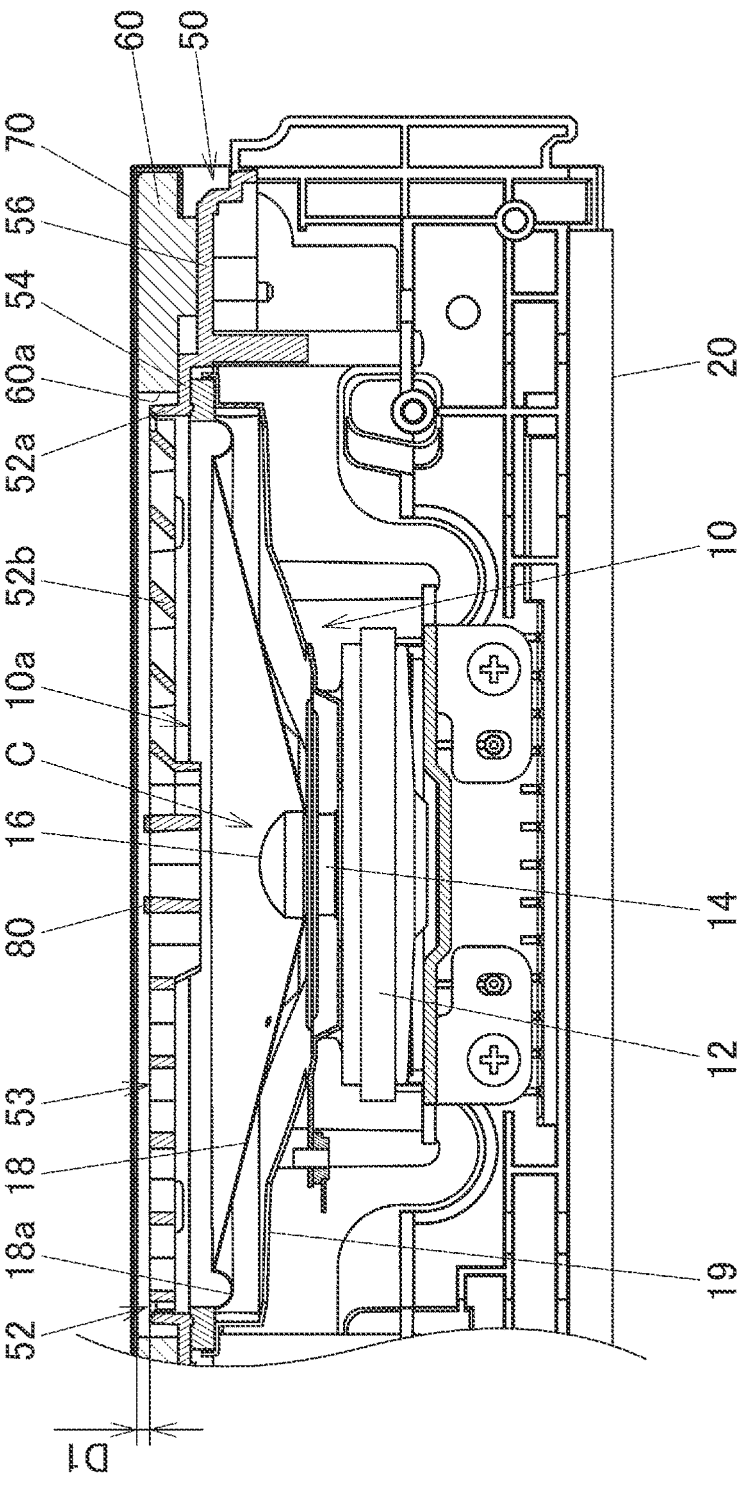
FIG. 5 is a horizontal sectional view of the speaker taken along a line IV-IV in FIG. 3.

The speaker apparatus 1 includes, on a front side thereof, a first cover (a first member) 50, a second cover (a second member) 60, which is disposed at a front of the first cover 50, the four speakers 10, and a saran net 70, which is configured to cover the first cover 50 and a front side of the second cover 60 (refer to FIGS. 2 and 5). The speaker apparatus 1 has an external appearance of a horizontally elongated rectangular parallelepiped shape and the portion excluding a front side thereof is made up of a housing which is the instrument case 119 of the electronic keyboard instrument 100 (an electronic musical instrument). A control circuit board or the like, not shown, for controlling the speaker apparatus 1 is disposed in an interior portion of the housing. Here, only a portion (an upper panel 20) of the housing, which makes up the external appearance of the speaker apparatus 1, is shown in FIG. 2. The other portions of the housing of the speaker apparatus 1 are made up of the instrument case 119 constituted by general panel members or the like which then make up a rear side, both left and right sides, and a lower side of the speaker apparatus 1.

The upper panel 20, which makes up a part of the housing and which has a horizontally elongated rectangular plate shape, is provided on an upper side of the speaker apparatus 1. The four speakers 10 each have a sound radiation port 10*a*, which defines a horizontally elongated oval shape as viewed from a front side thereof, and two speakers 10 are disposed side by side at each of left- and right-side portions of the speaker apparatus 1. On the front side of the speaker apparatus 1, a power supply switch 24 for switching on and off a power supply for the two speakers 10 disposed on the left-side portion of the speaker apparatus 1 is provided at a right upper portion relative to the relevant two speakers 10, and a power supply switch 24 for switching on and off a power supply for the two speakers 10 disposed on the right-side portion of the speaker apparatus 1 is provided at a left upper portion relative to the relevant two speakers 10. In addition, a terminal panel 30, into which various types of terminals are inserted, is provided at a centrally lower side on the front side of the speaker apparatus 1.

The four speakers 10 provided in the speaker apparatus 1 have the same configuration. As shown in FIG. 5, each speaker 10 is a general cone-type speaker and is provided at a front portion of the speaker apparatus 1 in such a state that the sound radiation port 10*a* is oriented to the front side. Each speaker 10 has a magnet portion 12 disposed at a rear side, a coil portion 14 disposed at a central portion lying inwards of the magnet portion 12, a cap portion 16 disposed at a central portion on the front side, a substantially circular truncated cone-shaped vibration plate 18 which expands radially outwards as it extends to the front, a frame portion 19 which supports an external side of the vibration plate 18, and the like. An outer circumferential edge portion of the vibration plate 18 is formed into an edge portion 18*a*. In each speaker 10, a sound radiation center C is positioned on an upper portion of the cap portion 16.

Figure 4:
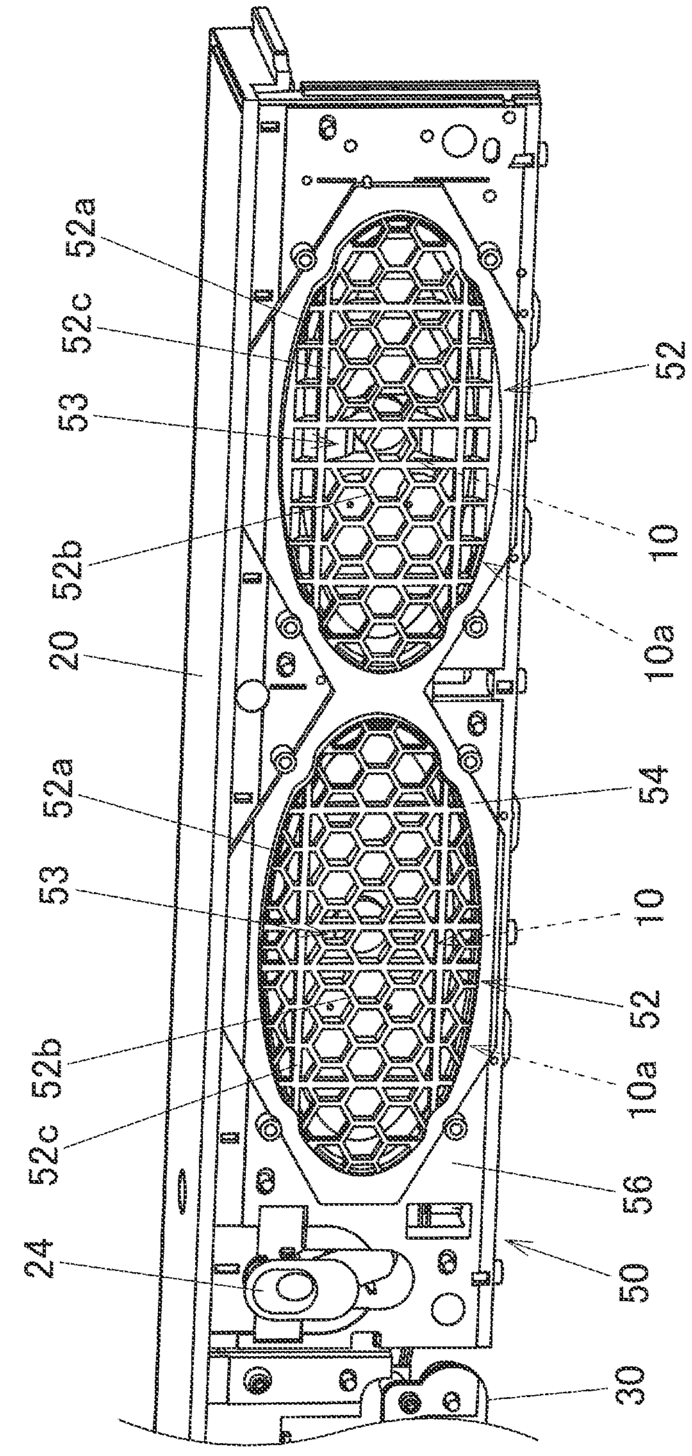
FIG. 4 is a perspective view showing a first cover as viewed from a front side thereof with a saran net, a second member, and a cushion member removed therefrom in the speaker apparatus according to the application example of the present disclosure.

As shown in FIG. 4, the first cover 50 is a horizontally elongated rectangular plate-shaped member made of a synthetic resin and is disposed in such a manner as to cover the front sides of the two adjacent speakers 10, which are disposed side by side at each of the right- and left-side portions of the speaker apparatus 1. That is, the speaker apparatus 1 includes two first covers 50. Each first cover 50 has two mesh portions 52, which are provided in such a manner as to be superposed above the corresponding sound radiation ports 10*a* of the two speakers 10, a frame-shaped portion 54 provided in such a manner as to surround a circumference of each of the mesh portions 52 in a frame-like fashion, and a plate-shaped portion 56 of a horizontally elongated plate-like shape provided outside the frame-shaped portion 54.

The plate-shaped portion 56 is attached to the upper panel 20, the control circuit board in an interior portion of the speaker apparatus 1, and the like with machine screws or the like in such a state that both plate surfaces thereof are oriented in a front-rear direction. The frame-shaped portion 54 protrudes forwards from a front surface of the plate-shaped portion 56 in a step-like fashion and is provided in such a manner as to surround a circumference of each of the mesh portions 52 within a horizontally elongated substantially regular octagonal shape.

Each mesh portion 52 is provided in such a manner as to protrude forwards slightly from a front surface of the frame-shaped portion 54, and an outer edge portion 52*a* of the mesh portion 52 defines a horizontally elongated substantially oval shape similar to that of the sound radiation port 10*a* of each speaker 10. The first cover 50 is disposed in such a manner that the outer edge portion 52*a* of the mesh portion 52 surrounds the edge portion 18*a* of the vibration plate 18 of the speaker 10. Each mesh portion 52 constitutes an opening area 53 which is made up of multiple opening portions which are defined by a first beam 52*b*, which is laid out from the outer edge portion 52*a* into a so-called honeycomb structure of a network of substantially hexagonal meshes, and a second beam 52*c*, which is laid out from the outer edge portion 52*a* to extend in vertical and horizontal directions. As shown in FIG. 3 and the like, the opening area 53 includes an opening portion 53*a* which is provided in a position which is superposed above the sound radiation center C of the speaker 10.

Figure 7:
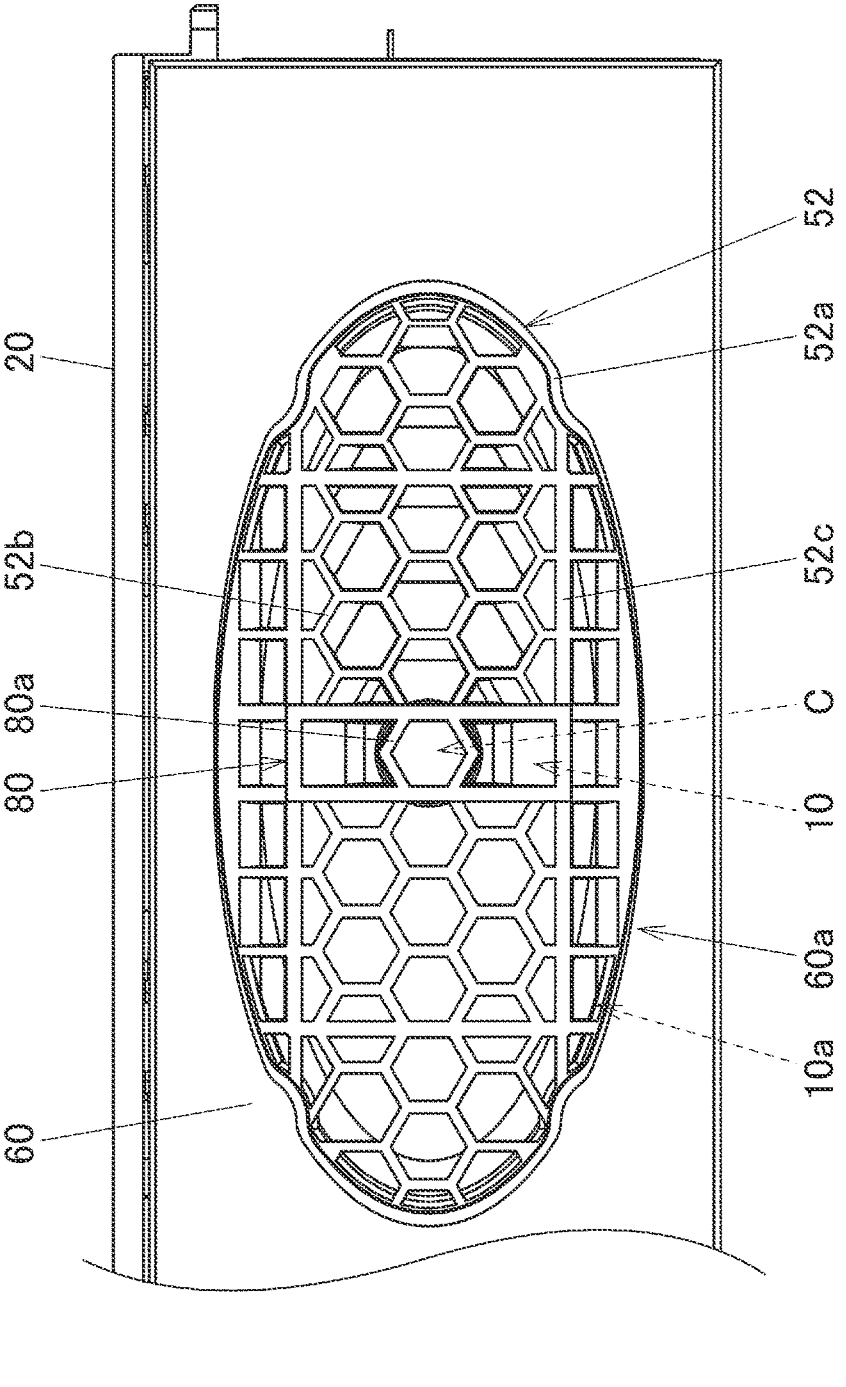
FIG. 7 is a front view showing in an enlarged fashion the speaker of the application example of the present disclosure, the front view specifically showing a disposition mode of a cushion member in an opening area.

Here, as shown in FIGS. 3 and 7, a thin vertically elongated substantially rectangular cushion member (a buffer member) 80, whose shape follows the first beam 52*b* and the second beam 52*c*, is disposed on a front surface of a substantially central portion of the opening area 53 (between the first cover 50 and the saran net 70, which will be described later). That is, the cushion member 80 is disposed in such a manner as to lie along a non-opening portion of the opening area 53 and has, at a central portion thereof, a bent beam-shaped portion (a beam-shaped portion) 80*a*, which is bent substantially into a collapsed V-shape along the non-opening portion of the opening area 53 at the sound radiation center C of the speaker 10. As a result, the cushion member 80 is disposed in the position which is superposed above the sound radiation center C of the speaker 10. The cushion member 80 is formed of a foamed urethane, elastomer, silicone, or the like, and has a thickness of, for example, 1 mm. The cushion member 80 is affixed to the first beam 52*b* and the second beam 52*c* with an adhesive or the like. Thus, the cushion member 80 can increase an in-plane strength in a plan view by incorporating the bent beam-shaped portion 80*a* described above, thereby making it possible to improve the working efficiency in affixing the cushion member 80 to the first cover 50.

As shown in FIGS. 2 and 7, the second cover 60 is made of a synthetic resin, constitutes a horizontally elongated rectangular plate-shaped member whose front surface is made into a flat plane, and is disposed in such a manner as to cover the front side of the speaker apparatus 1 excluding portions corresponding to the power supply switches 24, the terminal panel 30, and the sound radiation ports 10*a* of the four speakers 10. Then, the second cover 60 has sound radiation port opening portions 60*a* formed in positions which are superposed above the sound radiation ports 10*a* of the four speakers 10 in such a manner as to face individually the corresponding sound radiation ports. In other words, the second cover 60 is provided to surround individually the opening areas 53 in the first covers 50 in such a manner as to be superposed on sides of the first cover 50 which are opposite to the sides thereof which face the speakers 10. As a result, sound radiated from each speaker 10 is prevented from being interrupted by the second cover 60.

As shown in FIG. 5, specifically speaking, the second cover 60 is disposed so that the second cover 60 is brought into abutment with front surfaces of the plate-shaped portion 56 and the frame-shaped portion 54 of the first cover 50 and that the sound radiation port opening portions 60*a* thereof lie in the vicinity of the outer edge portions 52*a* of the mesh portions 52 of the first cover 50. With the second cover 60 disposed on the front surface side of the first cover 50, a front surface of the second cover 60 is positioned further forwards (further upwards in FIG. 5) than the mesh portions 52 of the first cover 50.

Figure 6A:
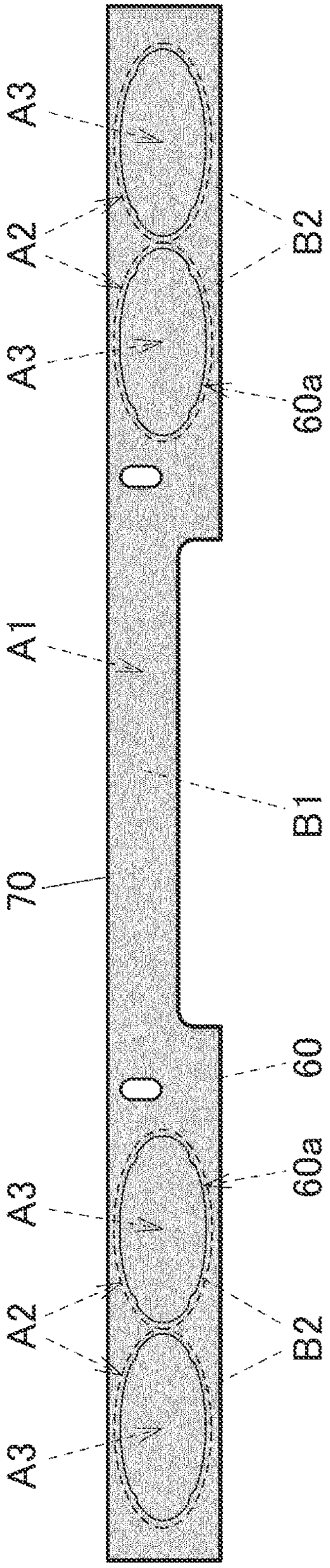
FIG. 6A is a front view showing a bonding mode of bonding support members and the saran net together in the application example of the present disclosure.
Figure 6B:
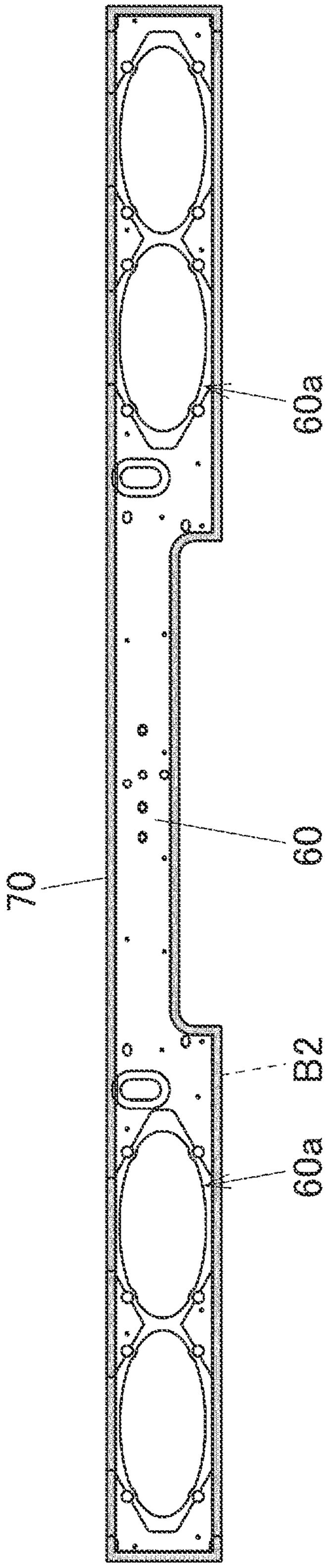
FIG. 6B is a back view showing the bonding mode of bonding the support members and the saran net together in the application example of the present disclosure.

The saran net 70 is formed of chemical fibers of, for example, polyester or the like, so that the saran net 70 constitutes a member whose transmission loss of sound radiated from each speaker 10 is small (a member having a superior sound transmission capability). The saran net 70 has a horizontally elongated rectangular shape and is one size larger than the second cover 60 as a whole. As shown in FIGS. 6A and 6B, the saran net 70 is provided in such a manner as to be bonded to the front surface of the second cover 60, which is formed into the flat plane, side surfaces of the second cover 60, and a part of a rear surface of the second cover 60, whereby the saran net 70 covers the front surface and side surfaces of the second cover 60 and the mesh portions 52 (the sound radiation ports 10*a* of the speakers 10) of the first cover 50. The saran net 70 and the mesh portions 52 of the first cover 50 are spaced apart from each other (over an area where the saran net 70 and the first cover 50 are superposed on each other) to thereby define a gap D1 of, for example, 2 mm therebetween. The saran net 70 and the cushion member 80 lie close to each other to thereby define a gap of, for example, 1 mm therebetween. Thus, as is described above, the saran net 70 is supported on a side thereof which faces the sound radiation ports 10*a* of the speakers 10 by the two members of the first cover 50 and the second cover 60.

Next, referring to FIGS. 6A and 6B, a bonding mode of bonding the saran net 70 to the second cover 60 will be described in detail. An area A1 on the front surface of the second cover 60 which excludes areas surrounding the sound radiation port opening portions 60*a* (portions which are superposed on the opening areas 53 in the first cover 50) and the saran net 70 are bonded together with a first adhesive B1. The first adhesive B1 is, for example, an adhesive in the form of a solvent of a styrene-butadiene rubber family having a low viscosity. On the other hand, areas A2 on the front surface of the second member 60 which correspond to the areas surrounding the sound radiation port opening portions 60*a* (the portions which are superposed on the opening areas 53 in the first cover 50) and the saran net 70 are bonded together with a second adhesive B2, which has a bonding strength higher than that of the adhesive B1. The second adhesive B2 is, for example, an adhesive in the form of a solvent of a chloroprene rubber family having a high viscosity. Here, the fact that an adhesive has a higher bonding strength means that one has to have more difficulty in separating things bonded together with the adhesive once it has set. States of the first adhesive B1 and the second adhesive B2 include states before and after the adhesives have set.

Since the areas A2 on the front surface of the second cover 60 which surround the sound radiation port opening portions 60*a* and the saran net 70 are bonded together with the adhesive B2 having the superior bonding strength in the way described above, portions of the saran net 70 which are superposed above the sound radiation port opening portions 60*a*, that is, areas A3 of the saran net 70 which are surrounded by the portions bonded with the second adhesive B2 are in such a state that a saran material is stretched due to tension exerted thereon. Here, the state in which the saran net 70 is stretched due to tension exerted thereon means a state in which almost no wrinkle or looseness is visible on the saran net 70, which exhibits a large spring-back force (resilient restoration force) when the saran net 70 is depressed down.

Next, a fabrication method of the speaker apparatus 1 according to the present application example will be described. A known speaker apparatus fabrication method can be applied to a step of assembling the housing including the upper panel 20 and a step of assembling the control circuit board and the like into the speaker apparatus 1, and hence, the description of those steps will be omitted here. In the present fabrication method, firstly, the first cover 50 is disposed in front of the speakers 10 in such a manner that the opening areas 53 in the first cover 50 are superposed above the sound radiation ports 10*a* of the speakers 10 and is then assembled to the housing of the speaker apparatus 1 (a first disposition step). Subsequently, the second cover 60 is disposed in front of the first cover 50 in such a manner as to surround the opening areas 53 of the first cover 50 (a second disposition step). That is, the second cover 60 is disposed in front of the first cover 50 in such a manner that the sound radiation port opening portions 60*a* of the second cover 60 are superposed above the opening areas 53 of the first cover 50 and is then assembled to the first cover 50.

Next, the first adhesive B1 is sprayed on to the area A1 and the areas A2 (refer to FIGS. 6A and 6B) using a spray device. Subsequently, the second adhesive B2, whose bonding strength is higher than that of the first adhesive B1, is applied to the areas A2 (refer to FIGS. 6A and 6B) surrounding the sound radiation port opening portions 60*a* on the front surface of the second cover 60 using a brush or the like. Subsequently, the saran net 70 is bonded to the area A1 to which the first adhesive B1 is applied and the areas A2 to which the first adhesive B1 and the second adhesive B2 are applied, and the front sides of the first cover 50 and the second cover 60 are covered by the saran net 70 so bonded (a bonding step).

In bonding the saran net 70, the saran net 70 is bonded to the second cover 60 in such a state that the portions of the saran net 70 which are superposed above the sound radiation port opening portions 60*a*, that is, the areas A3 (refer to FIGS. 6A and 6B) surrounded by the portions which are bonded with the second adhesive B2 are stretched due to tension exerted thereto. The exertion of tension on to the saran net 70 can be executed, for example, by stretching the saran net 70 with a uniform force exerted from the circumferences of the areas A2 to which the second adhesive B2 is applied.

Here, in the case that only the second adhesive B2 having the high bonding strength is used, the working efficiency of the step of bonding the saran net 70 is deteriorated. The step of bonding the saran net 70 is not such a step that tension is exerted on the whole surface of the saran net 70 so as to bond the saran net 70 altogether at one time, but in an actual step of bonding the saran net 70, tension is exerted manually on to portions of the saran net 70 a bit by a bit. In the case that the adhesive is erroneously applied to portions of the saran net 70 which are not desired to be bonded, in the event that the adhesive used is the second adhesive B2 having the high bonding strength, the resulting bonding effect will become too strong undesirably. On the other hand, in the case that only the first adhesive B1 having the low bonding strength is used, although large tension is required to prevent an occurrence of resonance in the saran net 70, the required large tension cannot be secured only with the first adhesive B1 having the low bonding strength. Then, large tension can be exerted on to the saran net 70 while securing the working efficiency of the bonding step of the saran net 70 by using the two types of adhesives in the way described above.

As described heretofore, with the speaker apparatus 1 according to the present application example, the first cover 50 is provided in such a manner that the opening areas 53 are superposed above the sound radiation ports 10*a* of the speakers 10, the second cover 60 is provided on the side of the first cover 50 which is opposite to the side thereof which faces the speakers 10 in such a manner that the sound radiation port opening portions 60*a* are superposed above the opening areas 53, and the saran net 70 is provided to cover the first cover 50 and the side (the front side) of the second cover 60 which is opposite to the side thereof which faces the speakers 10 while being bonded to the second cover 60. As a result, the saran net 70 is supported on the side thereof which faces the sound radiation ports 10*a* of the speakers 10 by the two members of the first cover 50 and the second cover 60. By adopting this configuration, the sufficient gap is secured between the sound radiation ports 10*a* of the speakers 10 and the opening areas 53 of the first cover 50, and the saran net 70.

Further, with the speaker apparatus 1 according to the present application example, the second cover 60 and the saran net 70 are bonded together with the first adhesive B1 at the area A1, and the second cover 60 and the saran net 70 are bonded together with the second adhesive B2, which has the higher bonding strength than that of the first adhesive B1, at the areas A2 on the front surface of the second cover 60 which surround the circumferences the sound radiation port opening portions 60*a*. By adopting this configuration, the large tension is exerted on the areas A3 which are surrounded by the portions bonded with the second adhesive B2, compared with the area A1 which is bonded with the first adhesive B1. Thus, with the speaker apparatus 1 according to the present application example, the large tension can be exerted on the saran net 70 while securing the sufficient gap between the sound radiation ports 10*a* of the speakers 10 and the saran net 70, thereby making it possible to prevent or suppress the occurrence of resonance in the saran net 70.

In addition, with the speaker apparatus 1, the saran net 70 is bonded to the second cover 60 with the tension exerted on at least the areas A3 which are surrounded by the portions bonded with the second adhesive B2. As a result, the larger tension can be exerted on the saran net 70 at the areas A3, thereby making it possible to prevent or suppress the occurrence of resonance in the speaker apparatus 1 more effectively.

With the speaker apparatus 1, the areas of the saran net 70 which are superposed above the opening areas 53 of the first cover 50 are spaced apart from the relevant opening areas 53. As a result, the specific configuration to secure the sufficient gap between the opening areas 53 of the first cover 50 and the saran net 70 can be provided.

With the speaker apparatus 1, the opening area 53 of the first member or the first cover 50 includes the opening portion 53*a* which is provided in the position which is superposed above the sound radiation center C of the speaker 10. As a result, since sound radiated from the sound radiation center C where sound becomes largest in magnitude passes through this opening portion 53*a*, sound radiated from the speaker 10 can be prevented from being lost or interrupted by the first cover 50.

With the speaker apparatus 1, the cushion member 80 is provided to be disposed between the first cover 50 and the saran net 70 while being bonded to the first cover 50. As a result, vibrations of the first cover 50 generated by sound radiated from the speakers 10 can be suppressed by the cushion member 80, thereby making it possible to prevent or suppress the occurrence of resonance in the speaker apparatus 1 effectively.

In addition, with the speaker apparatus 1, the cushion member 80 is bonded to the first cover 50 in such a manner as to lie along the non-opening portion of the opening area 53 of the first cover 50. As a result, vibrations of the first cover 50 in association with sound radiated from the speakers 10 can be suppressed further by the cushion member 80, thereby making it possible to prevent or suppress the occurrence of resonance in the speaker apparatus 1 more effectively.

With the speaker apparatus 1, the opening area 53 of the first cover 50 is provided by the first beam 52*b* and the second beam 52*c*, and the cushion member 80 is bonded to the first cover while lying along the first beam 52*b* and the second beam 52*c*. This can provide the specific configuration to dispose the cushion member 80 in such a manner as to lie along the non-opening portion of the opening portion 53.

With the speaker apparatus 1, the cushion member 80 has the bent beam-shaped portion 80*a* which is provided to lie along the non-opening portion at the sound radiation center C of the speaker 10. As a result, since the bent beam-shaped portion 80*a* functions as a beam on the cushion member 80, the in-plane strength of the cushion member 80 in the plan view can be increased, and further, the working efficiency in affixing the cushion member 80 to the first cover 50 can also be improved.

In addition, with the speaker apparatus 1, the cushion member 80 and the saran net 70 are disposed close to each other. As a result, in the case that the saran net 70 vibrates, the saran net 70 comes to interfere with the cushion member 80, whereby the vibration of the saran net 70 is absorbed by the cushion member 80, thereby making it possible to prevent or suppress the occurrence of resonance in the saran net 70 more effectively.

Further, the electronic keyboard instrument 100 which constitutes an electronic musical instrument having the speaker apparatus 1 can prevent or suppress the occurrence of resonance effectively at the time of sound radiation, thereby making it possible to make sound radiation of good quality.

The fabrication method of the speaker apparatus 1 includes the first disposition step of disposing the first cover 50 having the opening areas 53 each made up of the multiple opening portions in such a manner that the opening areas 53 are superposed above the corresponding sound radiation ports 10*a* of the speakers 10, the second disposition step of disposing the second cover 60 to be superposed on the side of the first cover 50 which is opposite to the side thereof which faces the speakers 10 in such a manner as to surround the opening areas 53 of the first cover 50, and the bonding step of bonding the saran net 70 to the second cover 60 in such a manner as to cover the first cover 50 and the side of the second cover 60 which is opposite to the side thereof which faces the speakers 10. In the bonding step, the second cover 60 and the saran net 70 are bonded together at the area A1 with the first adhesive B1 and at the areas A2 which surround the opening areas 53 of the first cover 50 with the second adhesive B2 having the higher bonding strength than that of the first adhesive B1.

With the fabrication method described above, by executing the first disposition step and the second disposition step, the first cover 50, the second cover 60, and the saran net 70 can be assembled together with the sufficient gap secured between the sound radiation ports 10*a* of the speakers 10 and the opening areas 53 of the first cover 50, and the saran net 70 in the position where the saran net 70 is superposed above the sound radiation ports 10*a* of the speakers 10. Further, by executing the bonding step, the saran net 70 can be bonded to the second cover 60 with the large tension exerted on the areas A3 which are surrounded by the portions bonded with the second adhesive B2, compared with the area A1 bonded with the first adhesive B1. As a result, the large tension is exerted on the saran net 70 while securing the gap between the sound radiation ports 10*a* of the speakers 10 and the saran net 70, whereby the speaker apparatus 1 can be fabricated which can prevent or suppress the occurrence of resonance therein.

With the fabrication method of the speaker apparatus 1, in the bonding step, the saran net 70 is bonded to the second cover 60 with the tension exerted on at least the areas A3 of the saran net 70 which are surrounded by the portions bonded with the second adhesive B2. As a result, in the bonding step, the larger tension can be exerted on the saran net 70 at the areas A3, thereby making it possible to fabricate the speaker apparatus 1 which can prevent or suppress the occurrence of resonance therein more effectively.

Figure 8:
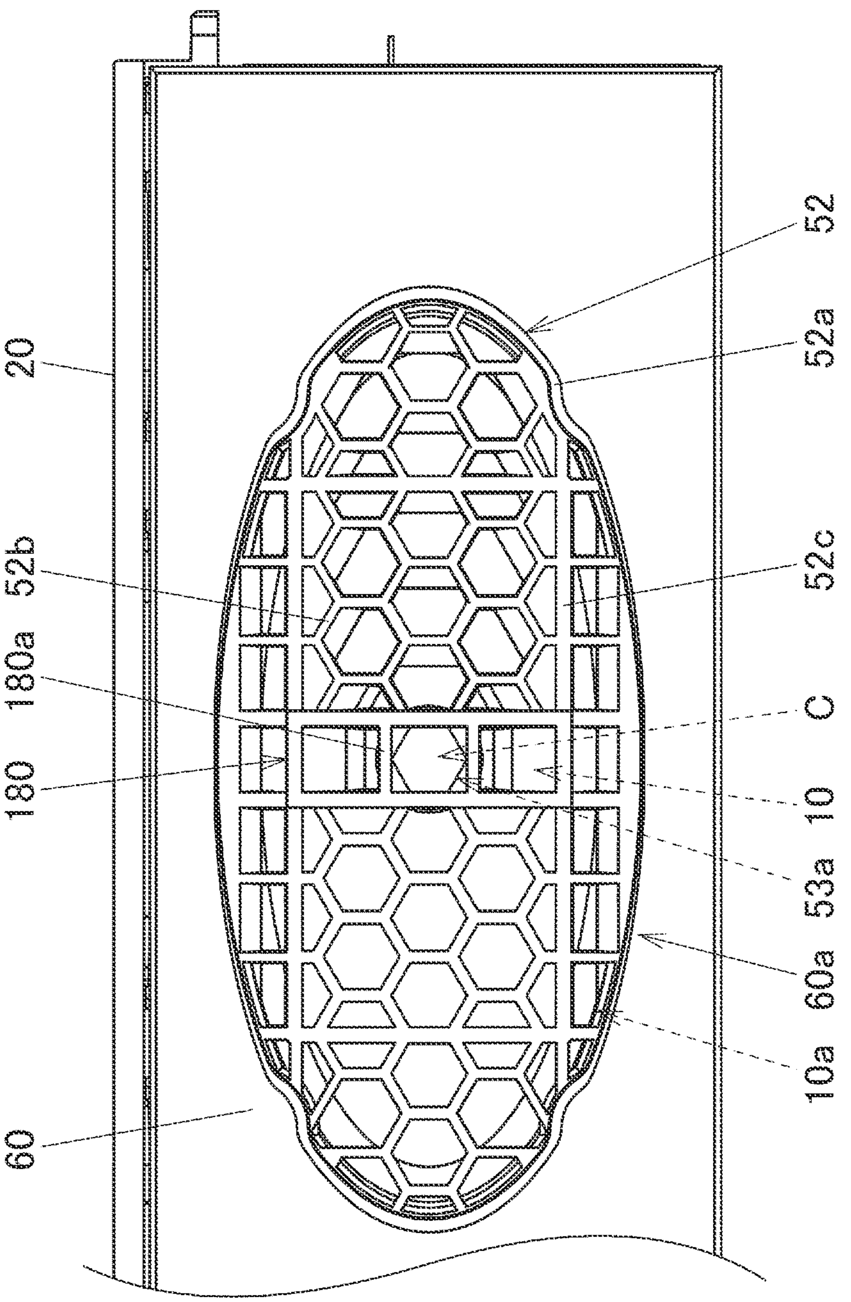
FIG. 8 is a front view showing in an enlarged fashion a speaker in a modified example of the present disclosure, the front view specifically showing a disposition mode of a cushion member in an opening area.

Next, referring to FIG. 8, a speaker apparatus (sound radiation apparatus) 1 according to a modified example of the present disclosure will be described. The modified example of the present disclosure differs in that a cushion member 180 has a different shape from that of the cushion member 80 according to the application example of the present disclosure. The other configurations of the modified example are similar to those of the application example of the present disclosure, and hence, the description thereof will be omitted here. As shown in FIG. 8, in the cushion member 180 according to the modified example of the present disclosure, a portion of the opening area 53 which surrounds the opening portion 53*a* provided in the position which is superposed above the sound radiation center C of the speaker 10 does not have the shape that follows the second beam 52*c* but is formed into a straight beam-shaped portion (a beam-shaped portion) 180*a* having a straight-line shape extending in a left-right direction. Although given the straight-line shape, the cushion member 180 according to the modified example of the present disclosure can provide the same advantageous effect as that of the cushion member 80 according to the application example of the present disclosure. Further, the cushion member 180 of the modified example of the present disclosure incorporates the straight beam-shaped portion 180*a* described above, thereby making it possible not only to increase the in-plane strength in the plan view but also to improve the working efficiency in affixing the cushion member 180 to the first cover 50.

The application example and the modified example which have been described heretofore are presented as the examples, and hence, there is no intention to limit the scope of the present invention by the examples. The novel application example or modified example can be carried out in other various forms, and various omissions, replacements and modifications can be made thereto without departing from the spirit and scope of the present invention. Those resulting application examples and modified examples thereof are included in the scope and gist of the present invention and are also included in the scope of inventions claimed for patent under claims below and their equivalents. For example, in the application example or the modified example, the configuration is exemplified in which the cushion member is disposed above the opening area; however, the application example or the modified example may be applied to a configuration in which the speaker apparatus includes no cushion member. Even with the speaker apparatus having this configuration, large tension can be exerted on the saran net while securing the gap between the sound radiation ports of the speakers and the saran net, thereby making it possible to prevent or suppress the occurrence of resonance in the saran net and thereby provide an electronic musical instrument making sound radiation of good quality.

What is claimed is:

1. A sound radiation apparatus, comprising:

a sound radiation unit;

a first member having an opening area which is provided in such a manner as to be superposed above at least a sound radiation port of the sound radiation unit and which is made up of multiple opening portions at a location which is superposed above the sound radiation port;

a second member provided to be superposed on a side of the first member which is opposite to a side thereof which faces the sound radiation unit in such a manner as to surround the opening area of the first member; and a covering member configured to cover the first member and a side of the second member which is opposite to a side thereof which faces the sound radiation unit and bonded to the second member, wherein the second member and the covering member are bonded together at an area on the second member which excludes a portion surrounding a circumference of the opening area of the first member with a first adhesive and at an area on the second member which surrounds the circumference of the opening area of the first member with a second adhesive having a higher bonding strength than a bonding strength of the first adhesive.

2. The sound radiation apparatus according to claim 1, wherein the covering member is bonded to the second member with tension exerted on at least an area which is surrounded by a location bonded with the second adhesive.

3. The sound radiation apparatus according to claim 1, wherein the first member comprises:

multiple mesh portions provided individually to be superposed above sound radiation ports of the multiple sound radiation units;

multiple frame-shaped portions provided individually to surround circumferences of the multiple mesh portions in a frame-like fashion; and a plate-shaped portion of a horizontally elongated plate shape which is provided outside the frame-shaped portions.

4. The sound radiation apparatus according to claim 3, wherein the mesh portion comprises:

an outer edge portion;

a first beam laid out from the outer edge portion into a honeycomb structure of a network of meshes of a substantially regular hexagonal shape; and a second beam laid out from the outer edge portion in vertical and horizontal directions.

5. The sound radiation apparatus according to claim 1, wherein a location of the covering member which is superposed above the opening area of the first member and the first member are spaced apart from each other.

6. The sound radiation apparatus according to claim 2, wherein a location of the covering member which is superposed above the opening area of the first member and the first member are spaced apart from each other.

7. The sound radiation apparatus according to claim 1, wherein the opening area of the first member comprises an opening portion provided in a position superposed above a sound radiation center of the sound radiation unit.

8. The sound radiation apparatus according to claim 1, comprising:

a cushion member disposed between the first member and the covering member and bonded to the first member.

9. The sound radiation apparatus according to claim 8, wherein the cushion member is bonded to the first member in such a manner as to lie along a non-opening portion of the opening area of the first member.

10. The sound radiation apparatus according to claim 9, wherein the opening area of the first member is provided by a beam, and wherein the cushion member is bonded to the first member in such a manner as to lie along the beam of the first member.

11. The sound radiation apparatus according to claim 9, wherein the cushion member has a beam-shaped portion provided to lie along the non-opening portion at the sound radiation center of the sound radiation unit.

12. The sound radiation apparatus according to claim 8, wherein the cushion member and the covering member are disposed close to each other.

13. An electronic musical instrument comprising the sound radiation apparatus according to claim 1.

14. A sound radiation apparatus fabrication method, comprising:

a first disposition step of disposing a first member having an opening area made up of multiple opening portions in such a manner that the opening area is superposed above a sound radiation port of a sound radiation unit;

a second disposition step of disposing a second member to be disposed on a side of the first member which is opposite to a side thereof which faces the sound radiation unit in such a manner as to surround the opening area of the first member; and a bonding step of bonding a covering member to the second member in such a manner as to cover the first member and a side of the second member which is opposite to a side thereof which faces the sound radiation unit, wherein in the bonding step, the second member and the covering member are bonded together at an area on the second member which excludes a portion surrounding a circumference of the opening area of the first member with a first adhesive and an area on the second member which surrounds the circumference of the opening area of the first member with a second adhesive having a higher bonding strength than a bonding strength of the first adhesive.

15. The sound radiation apparatus fabrication method according to claim 14, wherein in the bonding step, the covering member is bonded to the second member with tension exerted on at least an area of the covering member which is surrounded by a location bonded with the second adhesive.

* * * * *